United States Patent [19]

Wood et al.

[11] Patent Number: 5,419,795
[45] Date of Patent: May 30, 1995

[54] HIGH SLIP PACKAGING FILM WITH TRAPPED PRINT

[75] Inventors: John C. Wood, Milton; Giuseppe Accardi, Brampton, both of Canada

[73] Assignee: W. R. Grace & Co.-Conn., Duncan, S.C.

[21] Appl. No.: 100,011

[22] Filed: Jul. 29, 1993

[51] Int. Cl.⁶ ............................................. B32B 31/00
[52] U.S. Cl. ............................. 156/184; 156/229; 156/244.16; 156/244.17; 156/244.18; 156/259; 156/275.5; 156/277; 156/278; 156/272.6
[58] Field of Search ............... 156/184, 272.6, 277, 156/324, 244.16, 244.18, 244.24, 259, 260, 244.17, 275.5, 229, 278

[56] References Cited

U.S. PATENT DOCUMENTS

| | | | |
|---|---|---|---|
| 3,681,105 | 8/1972 | Cutakovie | 156/277 |
| 3,754,063 | 8/1973 | Schirmer | 156/277 |
| 3,767,500 | 10/1973 | Tally et al. | 156/184 |
| 4,120,716 | 10/1978 | Bonet | 156/272 |
| 4,457,960 | 7/1984 | Newsome | 428/35 |
| 4,484,971 | 11/1984 | Wang | 156/272.6 |
| 4,495,249 | 1/1985 | Ohya et al. | 428/516 |
| 4,724,185 | 2/1988 | Shah | 428/339 |
| 4,729,926 | 3/1988 | Koteles et al. | 428/474 |
| 4,764,028 | 8/1988 | Wood et al. | 383/20 |
| 4,995,927 | 2/1991 | Garrett | 156/277 |
| 5,200,123 | 4/1993 | Crass | 156/272.6 |
| 5,208,076 | 5/1993 | Wood | 427/428 |

FOREIGN PATENT DOCUMENTS 56-115291 9/1981 Japan ............................ 156/184

OTHER PUBLICATIONS

"Guide to Corona Film Treatment" Modern Plastics, May 1961.

*Primary Examiner*—Chester T. Barry
*Attorney, Agent, or Firm*—Mark B. Quatt

[57] ABSTRACT

A method of making a thermoplastic laminate includes the steps of extruding a tubular polymeric film; collapsing the extruded film to form a layflat film; slitting the edges of the collapsed film to form two plies; taking up both plies of the slit film onto a single take up roll to form a double wound film with two plies, the film having first and second outside surfaces; corona treating the first outside surface of the double wound film; applying a varnish to the treated surface; printing the varnished surface; corona treating the second outside surface of the double wound film; and taking up the printed film onto a wind-up roll such that the treated printed surface of one ply of the film in the roll bonds to the treated second outside surface on an adjacent wind in the roll, thereby forming a laminate. Alternatively, two separate films may be taken up on a take up roll to form a double wound film, and processed as described. The result is a trap printed laminate with good machinability and other properties.

14 Claims, 4 Drawing Sheets

HIGH SLIP PACKAGING FILM WITH TRAPPED PRINT

BACKGROUND OF THE INVENTION

This invention relates generally to the art of packaging films and more particularly to films useful in the packaging of food and other products.

It is common practice in packaging many goods, including food items, to use what is generally known as form-fill-seal equipment. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art and the end of the tube is sealed together by pairs of transverse heat seals which are vertically spaced apart, or closed by metal clips. At this point the tube is filled with a measured quantity of the product to be packaged. A second heat sealing or clipping operation, typically performed after the filled tube has been downwardly advanced, completes enclosure of the product. Simultaneously with or shortly after the second transverse heat sealing or clipping step the tube is completely transversely severed by known cutting means. Thereafter the tube is downwardly advanced and the cycle is successively repeated so as to form a multiplicity of individually packaged products.

Horizontal form-fill-seal equipment is also commonly used.

Manufacturers of form-fill-seal equipment include Hayssen, Omori, Ilapak, and Kartridge Pak. The latter is used to make a clipped pouch.

Flexible packaging material useful for this as well as other applications typically must meet stringent requirements imposed by the particular food or other article to be packaged. Limited oxygen transmission through the packaging material under both low and high humidity conditions is an essential feature of a packaging material for long-term storage of oxygen sensitive food products. This oxygen barrier feature should maintain the packaged food products for an extended period.

Dimensional stability of the packaging material in both low and high temperature regimes is sometimes necessary to prevent warping and distortion of the package after filling.

The flexible material must also have sufficient abuse resistance to physical and mechanical abuse imposed by the entire form-fill-seal or other packaging system.

Yet another requirement of packaging material, especially in form-fill-seal systems, is good heat sealability with respect to the longitudinal and transverse (if present) heat seals, which are sometimes subjected to loading forces from the introduced product such as food product, soon after the heat seal is formed.

Of interest is U.S. Pat. No. 4,120,716 issued to Bonet which discloses adhering printed film to a flexible film envelope by corona treating a face of the printed film and the flexible envelope, and then bringing the treated surfaces into contact with each other.

Of interest is U.S. Pat. No. 4,729,926 issued to Koteles et al which discloses a thermoplastic laminate with two substrates, one of the substrates having EVOH, and each of the substrates having an outer layer of LLDPE.

Also of interest is U.S. Pat. No. 4,724,185 issued to Shah which discloses a coextruded multilayer film with a core layer of EVOH, intermediate adhesive layers, and outer layers of a blend of LLDPE, linear medium density polyethylene, and EVA.

U.S. Pat. No. 4,457,960 issued to Newsome discloses the use of EVOH and EVOH blends in a multiple layer film. The film may be made as shrinkable film, and may be melt extruded. The outside layer of the multiple layer film may be a blend of linear low density polyethylene (LLDPE) and EVA.

U.S. Pat. No. 4,495,249 issued to Ohya et al discloses a multilayer laminate film with a core layer of a saponified copolymer of ethylene and vinyl acetate, and including two outer layers of a mixture of EVA and LLDPE. The multilayer laminate film of this reference can be made heat shrinkable and has gas barrier properties.

U.S. Pat. No. 4,764,028 issued to Wood et al discloses a hang bag with corona treated laminated surfaces.

Components such as waxes, which are put into a film to give it high slip characteristics, unfortunately also tend to inhibit the adhesion of printing ink to the film surface. They can also adversely affect the ink's behaviour by reducing its abuse resistance.

The inventors have found that the process described herein is very useful in taking advantage of the beneficial properties of high slip packaging materials, while minimizing the disadvantages relating to ink adhesion and level of abuse resistance.

It is an object of the present invention to provide a process for making a thermoplastic laminate suitable for the packaging of food and other products.

It is a further object of the present invention to provide a process for making a thermoplastic laminate useful in connection with form-fill-seal machines.

It is still another object of the present invention to provide a process for making a thermoplastic laminate which provides extended shelf life to food products.

It is also an object of the present invention to provide a process for making a printed thermoplastic laminate with good ink adhesion and abuse resistance properties.

SUMMARY OF THE INVENTION

In one aspect of the invention, a method of making a thermoplastic laminate comprises extruding a tubular polymeric film; collapsing the extruded film to form a layflat film; slitting the edges of the collapsed film to form two plies; taking up both plies of the slit film onto a single take up roll to form a double wound film with two plies, the film having first and second outside surfaces; corona treating the first outside surface of the double wound film; applying a varnish to the treated surface; printing the varnished surface; corona treating the second outside surface of the double wound film; and taking up the printed film onto a wind-up roll such that the treated printed surface of one ply of the film in the roll bonds to the treated second outside surface on an adjacent wind in the roll, thereby forming a laminate.

In another aspect of the invention, a method of making a thermoplastic laminate comprises feeding a first film and a second film to a take up roll, to form a double wound film with two plies, the film having first and second outside surfaces; corona treating the first outside surface of the double wound film; applying a varnish to the treated surface; printing the varnished surface; corona treating the second outside surface of the double wound film; and taking up the printed film such that the treated printed surface of one ply of the film in the roll bonds to the treated second outside surface on an adjacent wind in the roll, thereby forming a laminate.

Definitions

The term "double wound film" is used here to mean that an originally tubular monolayer or multilayer oriented or unoriented film or tape has been collapsed to form a lay-flat film, then is slit or trimmed along its lateral edges to form two plies (each by necessity having the same construction), and taken up onto a take up roll. The term also includes the alternative of feeding a monolayer or multilayer film onto a take up roll along with a second and distinct monolayer or multilayer film. This alternative provides a double wound film in which the two plies that are wound together are different in some aspect, such as construction, thickness, oriented vs. unoriented, cross-linked vs. uncrosslinked, etc. In either case, each ply of the double wound film can be of monolayer or multilayer construction.

The term "linear ethylene alpha olefin copolymer" (EAO) as used herein includes such materials as linear low density polyethylene [LLDPE], very low and ultra low density polyethylene [VLDPE], and metallocene catalyzed polymers such as those supplied by Exxon. Tafmer materials supplied by Mitsui can also be used instead of the above materials. These materials generally include copolymers of ethylene with one or more comonomers selected from $C_4$ to $C_{10}$ alphaolefins such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. "LLDPE" as defined herein has a density usually in the range of from about 0.916 grams per cubic centimeter to about 0.940 grams per cubic centimeter.

The terms "intermediate layer", "interior layer", and the like are used herein to define a layer in a multilayer film bounded on both sides by other layers.

The terms "antiblocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application.

The term "ethylene vinyl alcohol copolymer" is used herein to describe a vinyl alcohol copolymer having an ethylene comonomer, and prepared by for example, hydrolysis of vinyl acetate copolymers, or by chemical reactions with polyvinyl alcohol. Other oxygen barrier materials can also be used to some extent in the practice of this invention, depending on process conditions and desired end use. These include for example vinylidene chloride copolymers (saran), polyester, and nylon.

The terms "ethylene vinyl acetate copolymer", "EVA" and the like is used herein to refer to a copolymer formed from ethylene and vinyl acetate monomers wherein the ethylene derived units in the copolymer are present in major amounts, preferably between about 60% and 98% by weight, and the vinyl acetate derived units in the copolymer are present in minor amounts, preferably between about 2% and 40% by weight. Other ethylene unsaturated ester copolymers can also be used to some extent in the practice of this invention, depending on process conditions and desired end use. These include for example ethylene methyl acrylate copolymer, and ethylene butyl acrylate copolymer.

The term "oriented" and the like is used herein to define a material which, when heated to an appropriate temperature above room temperature (for example 96° C.), will have free shrink of 5% or greater in at least one linear direction.

The term "slitting" is used herein in the conventional sense of cutting the lateral edges of collapsed tubular film to form two plies. An alternative, equivalent for purposes of this invention and included in this definition of slitting, is edge trimming of the lateral edges. This involves actually removing a narrow strip of film from each lateral edge of the collapsed tubular film to form two plies.

The term "wind" refers to a packaging material disposed on a take up roll as a result of a single rotation of the roll.

BRIEF DESCRIPTIONS OF THE DRAWINGS

Details of the present invention are provided by reference to the drawing figures wherein.

DESCRIPTION OF THE PREFERRED EMBODIMENTS

Figure 1:
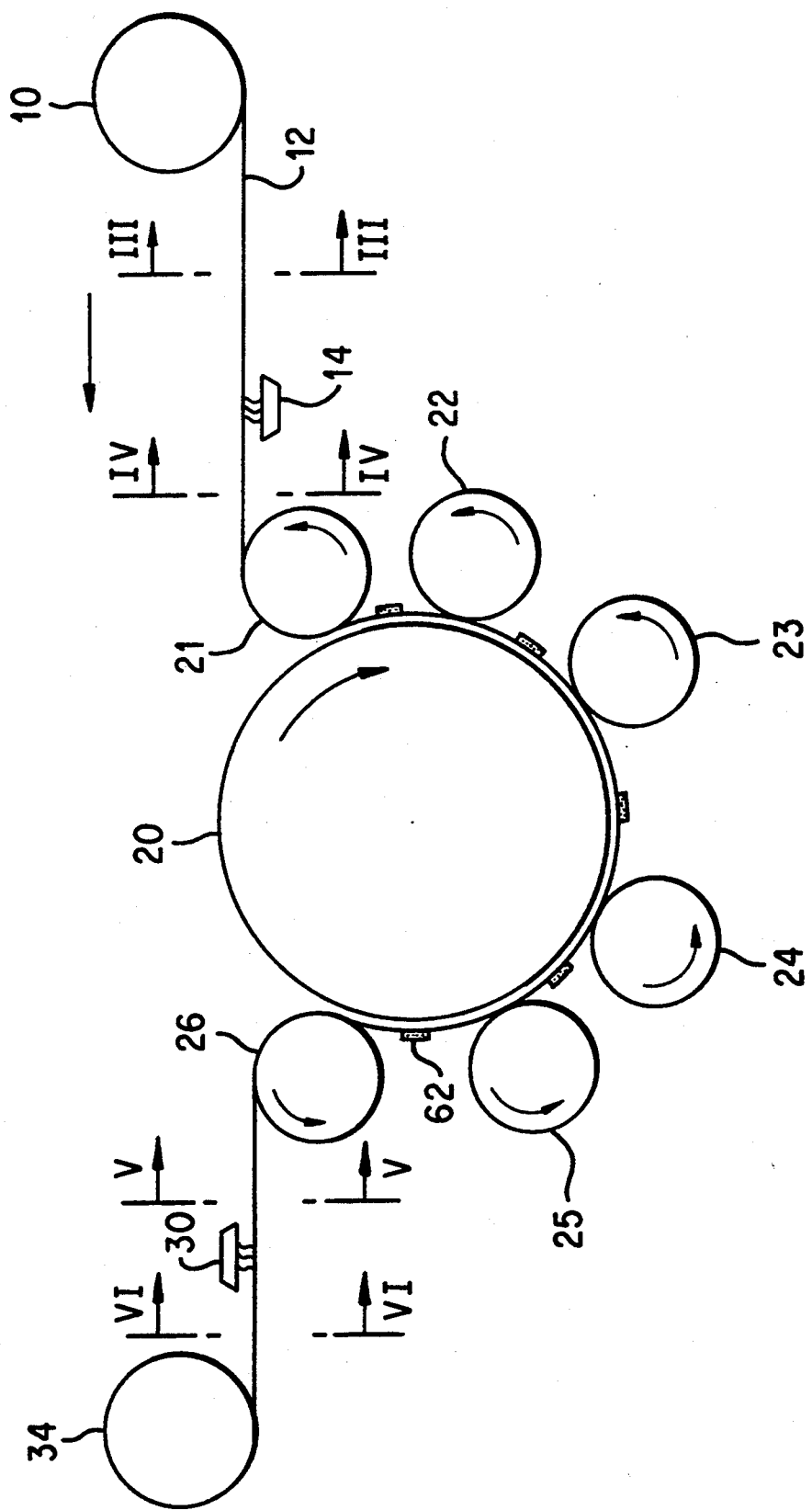
FIG. 1 is a schematic diagram showing the steps for making a laminate by the inventive process.

Referring to FIG. 1, a schematic of the process and apparatus of the present invention is shown.

A first take up roll 10 holds double wound film. This film is preferably obtained from a tubular extrusion process, such as tubular cast extrusion, in which the extruded tape is quenched, reheated to its orientation temperature, and oriented by biaxially stretching using the blown bubble or equivalent means. Part or all of the film can be crosslinked chemically or electronically, before or after orientation in the case of electronic crosslinking. Alternatively, hot blown extrusion well known in the art can be employed. In either case, the resulting tubular film is collapsed, and slit or edge trimmed by conventional means. The resulting two ply film is "double wound" onto the first take up roll.

Figure 3:
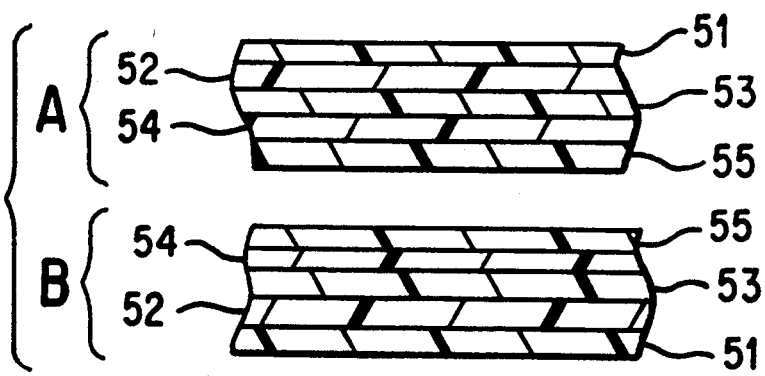
FIG. 3 is a schematic cross section of a multilayer laminate made by the inventive process, at position III—III of FIG. 1.
Figure 4:
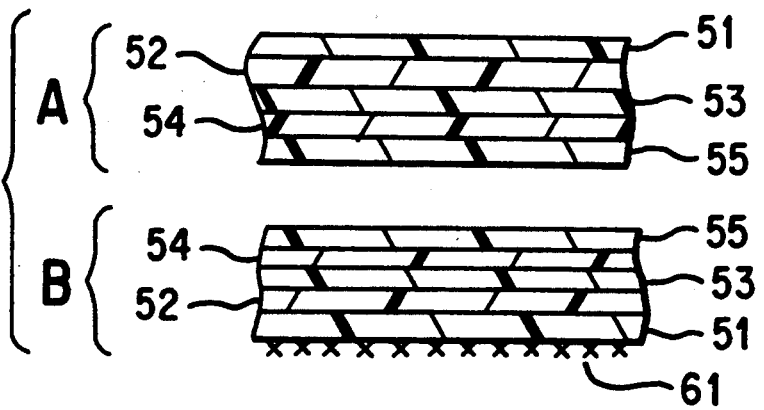
FIG. 4 is a schematic cross section of a multilayer laminate made by the inventive process, at position IV—IV of FIG. 1.

The two ply double wound film 12 is taken from take up roll 10 for further processing, and at this point (line III—III of FIG. 1) in the process has the construction representatively shown in FIG. 3. Although the plies A and B are shown in FIGS. 3 to 6 as spaced apart, they will typically be in contact with each other at layers 55 as the film 12 is processed as described hereafter.

The two ply film 12 is treated on one of its outside surfaces, i.e. one of the surfaces of one of the plies, by corona discharge treatment at station 14. The treated film (line IV—IV of FIG. 1) is shown graphically in FIG. 4, where a series of x's illustrates a corona discharge treated surface 61. Corona treatment technology per se is conventionally known in the art.

The now treated film (both plies) is advanced to a flexographic printing system which includes a central impression drum 20, and printing rollers 21 to 26. The flexo system is conventional per se except that a varnish is coated on the treated surface 61 of film 12 in lieu of a conventional printing ink. This application is done at the first station 21 of the flexographic printing system. Anilox rolls, dryers, and other conventional ancillary components of the flexographic printing system are not shown for the sake of clarity and simplicity.

The varnish has resins dissolved in solvents. An example of a suitable varnish is Bondaflex C ™ ink varnish manufactured by Zeneca Specialty Inks. The resins preferably have a high surface energy when in the form of a dried film. The solvents preferably have a relatively low surface tension, more preferably below 23 dynes/centimeter.

After application of the varnish, the film is printed with one or more inks in a conventional way at stations 22 through 26, described briefly e.g. in the background of U.S. Pat. No. 5,208,076. For the sake of clarity, film 12 is shown as spaced apart from central impression drum 20 as the film travels around the drum during the printing step. In fact, film 12 contacts the drum during the printing process.

Figure 5:
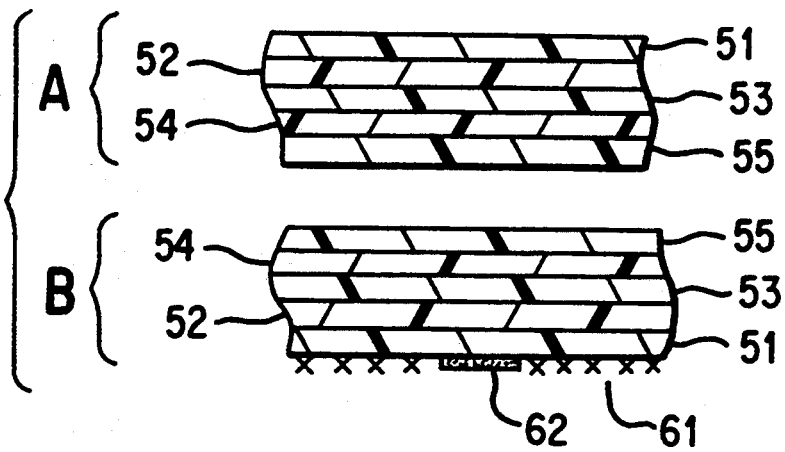
FIG. 5 is a schematic cross section of a multilayer laminate made by the inventive process, at position V—V of FIG. 1.

After printing, the film (line V—V of FIG. 1) has the construction shown representatively in FIG. 5, where 62 indicates the printed ink on treated surface 61.

Figure 6:
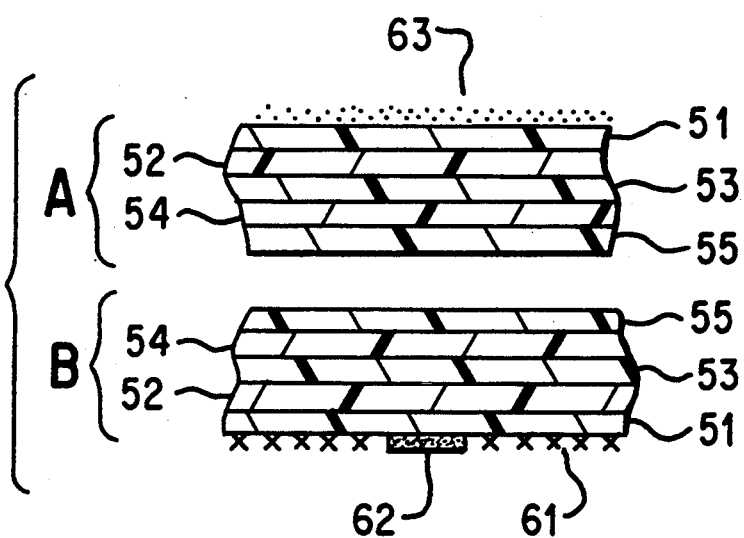
FIG. 6 is a schematic cross section of a multilayer laminate made by the inventive process, at position VI—VI of FIG. 1.

The printed film is now exposed to a second corona treatment at station 30. This time, the other outside surface of the double wound film 12 is treated. The result (line VI—VI of FIG. 1) is shown in FIG. 6 where a series of dots illustrates a corona discharge treated surface 63.

Figure 2:
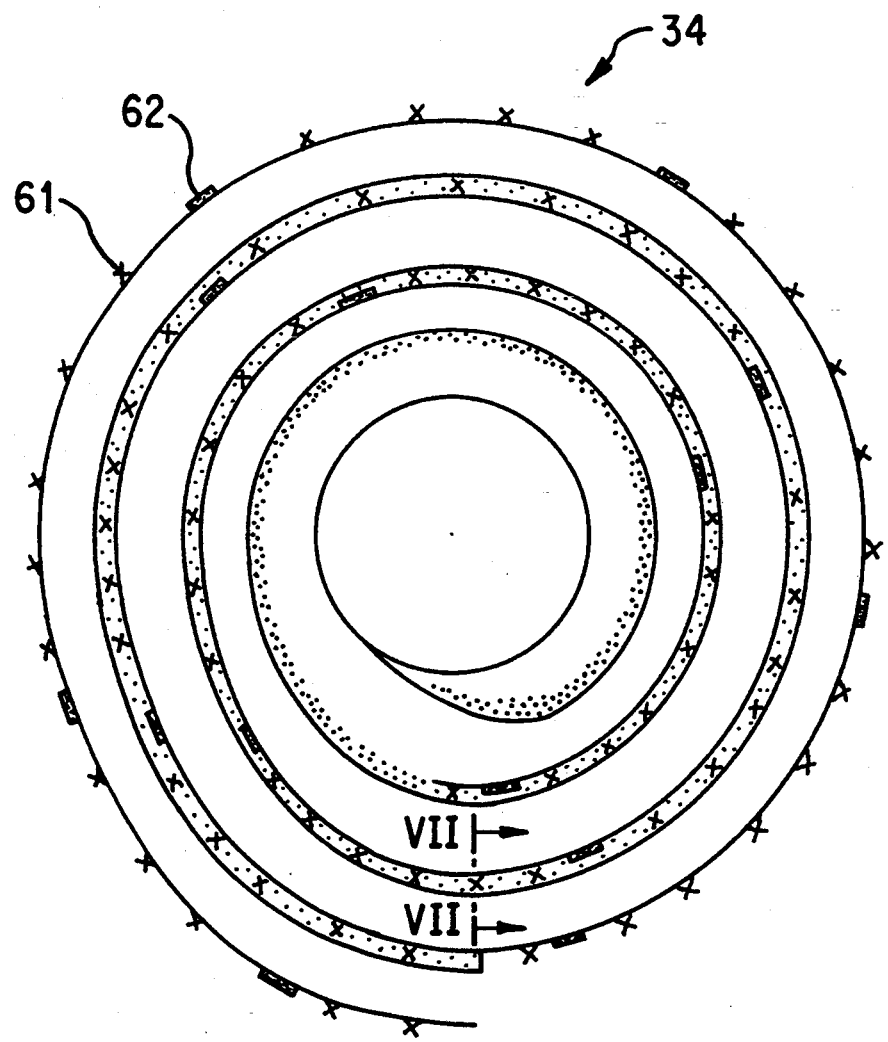
FIG. 2 is a schematic cross section of a take up roll showing a preferred embodiment of a laminate made by the inventive process.

The treated, printed film is then wound on a core while applying high tension to get a significant degree of pressure between the "winds" of the film and the roll. FIG. 2 shows the rewound film in a partly expanded or loose arrangement for the sake of illustrating the relationship of the plies discussed hereafter.

Figure 7:
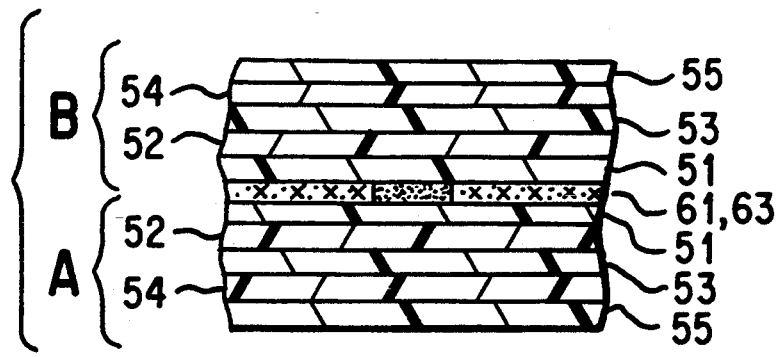
FIG. 7 is a schematic cross section of a multilayer laminate made by the inventive process, at position VII—VII of FIG. 2.

As the roll is wound up, the treated printed surface on one wrap or wind of the film bonds to the treated but unprinted surface on the adjacent or next wind to form a bonded laminate. This leaves one outer wrap of a single ply of the double wound film. This single ply can be removed by unwinding one turn. The result is a laminate in which the print is now trapped between the two former plies of the film. This is illustrated in FIG. 7 (see also VII—VII of FIG. 2).

The structure depicted in FIGS. 3 through 6 is directed to a double wound film 12 having a first ply A and second ply B. Various films can be used in connection with the present inventive process. A particularly suitable film is described in U.S. Pat. No. 4,724,185.

Each ply A and B is a multilayer film having the generalized structure of X/Y/Z/Y/X where X is an outer layer, Y is an intermediate adhesive layer, and Z is a core layer containing an oxygen barrier material. The total thickness of each of A and B is preferably about 0.5 mils. The final laminate of the present invention is preferably about 1 mil thick.

Preferably, core layer 53 comprises an ethylene vinyl alcohol copolymer. Core layer 53 preferably forms between about 5% and 25% of the total film thickness. Thicknesses less than about 5% result in a very thin film with possible voids in the barrier material. Thicknesses greater than about 25% make the film difficult to stretch or rack, and also result in increased cost due to the expensive barrier component.

Intermediate layers 52 and 54 are polymeric adhesives, preferably acid or acid anhydride-modified polymeric material which can bond the core layer 53 to the outer layers 51 and 55 respectively.

Outer layers 51 and 55 comprise a blend of a linear ethylene alpha olefin copolymer and an ethylene unsaturated ester copolymer (EUE). A preferred EAO is LLDPE or a blend of two LLDPE resins. A preferred EUE is EVA, with a vinyl acetate (VA) content of preferably between about 3.0 and 9% by weight and more preferably between about 3.3 and 5% by weight. At VA contents greater than about 9%, the multilayer film becomes too sticky or tacky for many applications, or requires the use of relatively large amounts of slip and antiblock additives.

If crosslinked, at least one layer of the film is preferably irradiated with between about 0.5 and 13 megarads (M.R.) of irradiation, even more preferably between about 1 and 6 M.R. If oriented, any crosslinking is done preferably prior to orientation of the film. Orientation is done by racking or stretching the film at a racking ratio of preferably between about 3.0 and about 7.0 times the original dimensions of the film in the longitudinal and/or transverse directions.

Layers 51 and 55 preferably include a small amount of additives. Preferred is about 15% of a masterbatch concentrate containing slip and antiblock additives compounded with EVA of about 3.3% vinyl acetate content by weight.

In the preferred embodiment just described, each of plies A and B is a symmetrical film structure having the generalized construction X/Y/Z/Y/X.

Alternatively, plies A and B can have an assymetrical structure such as X/Y/Z/Y/D, where D is a material or blend of materials distinct from X. D can be any of the materials or blends of materials discussed herein, or any other suitable polymeric material. It will be appreciated after a review of the present specification, that as the inventive process is practiced with respect to a single extruded tubular film slit into two plies, the final laminate will have identical outside and inside layers even when the individual plies A and B are asymmetric in construction. For example, in the case of X/Y/Z/Y/D, the final laminate will have outer surface layers of D, and inner layers of X. Of course, other asymmetric configurations can also be employed, such as X/Y/Z/D/X, X/Y/D, X/Y/Z/D, D/X/Y/Z/Y/X/Z, etc. This arrangement permits the selection of a material for the original outside layers of the plies (51 of the Figures) which is optimal for inclusion as the ultimate inside layers of the final laminate. For example, the material can be selected based on its responsiveness to corona treatment or printing, or its adhesive qualities. Conversely, the original inside layers of the plies A and B (55 of the Figures) can comprise a material or blend optimal for inclusion as the ultimate outside layers of the final laminate. For example, the material can be selected based on sealability, abuse resistance, etc. Thus, the invention provides a way to tailor laminate constructions based on the intended end use application.

Although plies A and B are preferably similar or even identical to each other, in an alternative arrangement, these plies can be distinct in composition, number of layers, presence or degree of orientation and/or crosslinking, additive loading, total gauge, layer gauge, or other film parameters. This can result in a laminate with differing surface layers 55. By appropriate selection of resins, the laminate can be tailored to provide e.g. a sealant layer and an abuse layer best suited for a particular packaging application. Thus, films derived from separate extrusion runs can be brought together at a take up roll 10 to form a double wound film for processing as just described.

Examples of laminates produced in accordance with the present invention are given below.

Example 1

A film was prepared by blending 50% of LLDPE (Dowlex 2045), 25% LLDPE (Dowlex 2037) and 10% EVA having a vinyl acetate content of about 3.3%, blended with about 15% of a masterbatch concentrate containing slip and antiblock additives compounded with EVA of about 3.3% vinyl acetate content by weight. This outside blend layer, shown as layer 51 in FIGS. 1 and 2, was coextruded with a core layer 53 containing a blend of 90% EVOH (EVAL LC-F101A from EVALCA) and 10% of a nylon 6/nylon 12 copolymer (Grillon CF-6S from Emser) which is a caprolactam laurolactam copolymer, and intermediate polymeric adhesive layers 52 and 54 comprising a polymeric adhesive (Admer SF 700 A from Mitsui). The Dowlex 2045 and 2037 may be obtained from Dow Chemical Company. These are copolymers of ethylene and octene. Outer layer 55, coextruded with these other layers, was like layer 51 in composition.

The EVA of the outside blend layer is commercially available from Rexene under the trade designation PE 1335. The vinyl acetate content of this EVA is about 3.3% by weight.

The EVOH of the core blend layer had an ethylene content of about 32%. Other suitable EVOH resins include EVAL E, EVAL H, and EVAL K, as well as blends of the above, and preferably such resins or blends having a melt index of between about 1 to 4 grams per ten minutes (ASTM 1238). The Grillon CF-6S is a nylon copolymer having about 60% nylon 6 and about 40% nylon 12 by weight. Although not necessary for the practice of the invention, the nylon copolymer is useful, especially when the core layer is very thin, in minimizing any pinholes that can sometimes occur in the core layer during processing.

Other suitable polymeric adhesives for layer 52 and 54 include Bynel CXA 4104 from Du Pont.

The polymer melt from the coextrusion die was then cooled and cast into a solid tape which was irradiated with about 3 megarads of irradiation. The tape was then heated to about 115° C. in an oven and blown into a bubble. The bubble was expanded to about 3.2 times its original dimensions in both the machine (longitudinal) and transverse directions, and then deflated and collapsed, slit, and taken up onto a double wound film roll. Each ply had a gauge thickness of about 0.5 mil.

The plies were treated, printed, and bonded together by the above-described process.

Example 2

A laminate similar to that of Example 1 is prepared in a similar procedure, but in which each of plies A and B has an assymetric construction X/Y/Z/Y/D.

Example 3

A laminate similar to that of Example 1 is prepared in a similar procedure, but in which the second ply B is a monolayer polyolefinic film.

Coextrusion, crosslinking, and orientation steps are done by processes well known in the art.

It has been found that laminates made in accordance with the present invention run better, i.e. more packages per minute, on packaging equipment commonly used in the industry, compared with a single ply A or B run on the same equipment, where A and B have the structure described in Example 1.

On some films which have a low surface energy or which are difficult to treat to get a higher surface energy, it may be necessary to apply a varnish on the second outer surface of the double wound film. In this case, the second surface of the double wound film is corona treated (see 30 in FIG. 1), and the varnish is then applied to the second surface.

Various changes and modifications to the invention can be made by one skilled in the art without departing from the scope of the claims as presented below. For example, although preferred embodiments have been described herein, any suitable polymeric resins or blends thereof can be used in monolayer or multilayer arrangements described herein, and in the case of multilayer films, any suitable number of layers can be used.

Films can be extruded, coextruded or extrusion coated, cast, hot blown, etc. Although tubular extrusion is preferred, films can also be made by slot die extrusion or conventional lamination techniques and brought together to form a two ply double wound film as described herein.

We claim:

1. A method of making a thermoplastic laminate comprising:
   a) extruding a high slip tubular polymeric film characterized by the presence of slip additives in one or more layers of the film;
   b) collapsing the extruded film to form a layflat film;
   c) slitting the edges of the collapsed film to form two plies;
   d) taking up both plies of the slit film onto a single take up roll to form a double wound film with two plies, the film having first and second outside surfaces;
   e) corona treating the first outside surface of the double wound film;
   f) applying a varnish including a solvent with a surface tension below 23 dynes/centimeter to the treated surface;
   g) printing the varnished surface;
   h) corona treating the second outside surface of the double wound film; and
   i) taking up the printed film onto a wind up roll such that the treated printed surface of one ply of the film in the roll bonds to the treated second outside surface on an adjacent wind in the roll, forming a laminate.

2. The process of claim 1 further comprising the step of electronically or chemically crosslinking the tubular polymeric film at some stage before printing.

3. The process of claim 1 further comprising the step of orienting the tubular polymeric film at some stage before printing.

4. The process of claim 1 further comprising the step of applying a varnish to the second, treated outside surface after step h) and before step i).

5. The method of claim 1 wherein the corona treating step of h) takes place after the printing step of g).

6. A method of making a thermoplastic laminate comprising:
   a) feeding a first film and a second film, at least one of which is a high slip film characterized by the presence of slip additives in ore or more layers of said at least one film, to a take up roll to form a double wound film with two plies, the double wound film having first and second outside surfaces;
   b) corona treating the first outside surface of the double wound film;
   c) applying a varnish including a solvent with a surface tension below 23 dynes/centimeter to the treated surface;
   d) printing the varnished surface;
   e) corona treating the second outside surface of the double wound film; and
   f) taking up the printed film such that the treated printed surface of one ply of the film in the roll bonds to the treated second outside surface on an adjacent wind in the roll, thereby forming a laminate.

7. The process of claim 6 wherein the second film differs in some way from the first film.

8. The process of claim 6 wherein the first and second films have been separately extruded before step a).

9. The process of claim 6 further comprising the step of electronically or chemically crosslinking at least one of the films at some stage before printing.

10. The process of claim 6 further comprising the step of orienting at least one of the films at some stage before printing.

11. The process of claim 6 further comprising the step of applying a varnish to the second, treated outside surface after step e) and before step f).

12. The method of claim 6 wherein the corona treating step of e) takes place after the printing step of d).

13. A method of making a thermoplastic laminate comprising:
   a) extruding a tubular polymeric film;
   b) collapsing the extruded film to form a layflat film;
   c) slitting the edges of the collapsed film to form two plies;
   d) taking up both plies of the slit film onto a single take up roll to form a double wound film with two plies, the film having first and second out side surfaces;
   e) corona treating the first outside surface of the double wound film;
   f) applying a varnish to the treated surface, the varnish including a solvent with a surface tension below 23 dynes/centimeter;
   g) printing the varnished surface;
   h) corona treated the second outside surface of the double wound film; and
   i) taking up the printed film onto a wind up roll such that the treated printed surface of one ply of the film in the roll bonds to the treated second outside surface on an adjacent wind in the roll, forming a laminate.

14. A method of making a thermoplastic laminate comprising:
   a) feeding a first film and a second film to a take up roll, to form a double wound film with two plies, the film having first and second outside surfaces;
   b) corona treating the first outside surface of the double wound film;
   c) applying a varnish to tile treated surface, the varnish including a solvent with a surface tension below 23 dynes/centimeter;
   d) printing the varnished surface;
   e) corona treating the second outside surface of the double wound film; and
   f) taking up the printed film such that the treated printed surface of one ply of the film in the roll bonds to the treated second outside surface on an adjacent wind in the roll, thereby forming a laminate.

* * * * *